US007670061B2

(12) United States Patent
Gerard et al.

(10) Patent No.: US 7,670,061 B2
(45) Date of Patent: Mar. 2, 2010

(54) HIGH CONTACT DENSITY MINIATURE CONNECTOR

(75) Inventors: Philippe Gerard, Chennevieres-sur-Marne (FR); Philippe Mallet, Paris (FR)

(73) Assignee: Souriau, Versailles (FR)

( * ) Notice: Subject to any disclaimer, the term of this patent is extended or adjusted under 35 U.S.C. 154(b) by 18 days.

(21) Appl. No.: 12/138,523

(22) Filed: Jun. 13, 2008

(65) Prior Publication Data

US 2008/0317404 A1 Dec. 25, 2008

(30) Foreign Application Priority Data

Jun. 15, 2007 (FR) .................................. 07 04270

(51) Int. Cl.
*G02B 6/38* (2006.01)

(52) U.S. Cl. ............................ 385/71; 385/53; 385/55; 385/70

(58) Field of Classification Search .................. 385/53, 385/55, 70, 71
See application file for complete search history.

(56) References Cited

U.S. PATENT DOCUMENTS

| | | | |
|---|---|---|---|
| 5,242,315 | A | 9/1993 | O'Dea |
| 5,401,189 | A | 3/1995 | Sato |
| 2004/0224567 | A1 | 11/2004 | Zhong et al. |

FOREIGN PATENT DOCUMENTS

| | | | |
|---|---|---|---|
| EP | 1026788 | A1 | 8/2000 |
| JP | 63097907 | A | 4/1988 |

OTHER PUBLICATIONS

Search Report dated Jan. 30, 2008 for FR 07/04270.

*Primary Examiner*—Jennifer Doan
(74) *Attorney, Agent, or Firm*—Perman & Green LLP

(57) ABSTRACT

A miniature high density connector including a thermoplastic insulating body having contact cavities for the insertion, the positioning and the retention of electrical, optical or electro-optical contacts, a back plate having clips for the locking of the contacts into the contact cavities of the insulating body, a receptacle shell constituting an interface element for coupling with a complementary mating connector having a flange for the assembly and the retention of the insulating body and the back plate in the receptacle shell, the back plate being movable and including a projecting dimple located on the side wall, making possible its locking into the receptacle shell.

9 Claims, 2 Drawing Sheets

HIGH CONTACT DENSITY MINIATURE CONNECTOR

CROSS REFERENCE TO RELATED APPLICATIONS

Figure 1:
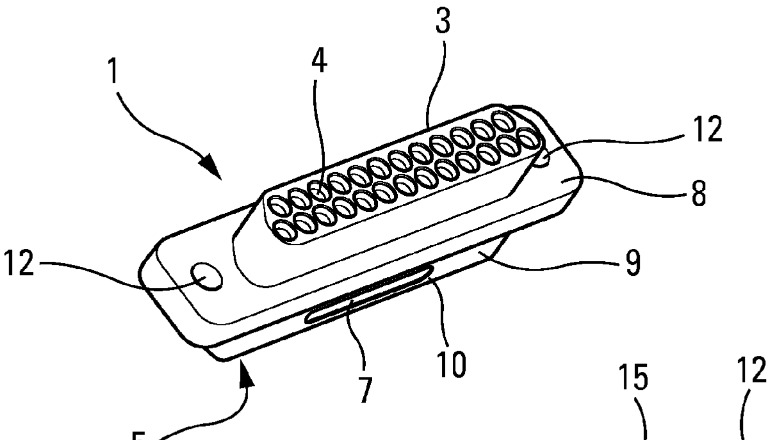

This application claims priority to French application number 0704270, filed on Jun. 15, 2007, the disclosure of which is incorporated herein by reference in its entirety.

BACKGROUND

1. Field

The aspects of the disclosed embodiments provide a high contact density miniature connector, and in particular a miniature electrical connector equipped with a movable insulating body.

The aspects of the disclosed embodiments are applicable in data processing, telecommunication and in general, in fields calling for the processing of high-speed signals in very restricted spaces.

2. Brief Description of Related Development

Extensive need exists in the aforementioned fields for the size reduction of components, which need to be introduced into ever decreasing available spaces. Likewise in progress is a search for a reduction of the weight of components, as well as for solutions for the replacement of parts of components fixed on installations, in terms of both maintenance work and of signal processing improvement via the introduction of more efficient means.

There are numerous embodiments of connectors called miniatures or sub-miniatures of a rectangular or a circular shape, which make possible the introduction of high-density electrical or optical contacts that is to say, contacts distributed in the insulating bodies, or inserts, according to the smallest possible square or triangular pitch networks.

In these embodiments according to the size of the contact used, the pitch is calculated in order to allow a distance between the contacts conferring the required electrical insulation properties.

This distance must moreover be compatible with the size of the means of locking the contact into the contact reception contact cavities made in the insulating body.

Their number, the distribution and the dimensions of these contact cavities as well as their internal geometry often has several shoulders for the positioning and holding in place of the contacts consequently make it difficult and indeed impossible to secure an insulating body by a simple moulding operation of the thermoplastics which they consist of.

There is accordingly a need to make available on the market high contact density miniature and sub-miniature connectors in which the introduction or the replacement of their constituent parts can be implemented at any time during their life, simplifying the operations of moulding of the insulating bodies used in these connectors.

The aspects of the disclosed embodiments are directed to a high-density miniature connector comprising a thermoplastic insulating body containing contact cavities for the insertion, the positioning and the retention of electrical, optical or electro-optical contacts, a back plate comprising clips for the locking of the contacts into the insulating body contact cavities, a receptacle shell constituting an interface element for coupling with a complementary mating connector comprising a flange making possible the assembly and the holding in place of the insulating body and the back plate in the said receptacle shell, in which the back plate is movable and comprises at least one projecting dimple located on its side wall and making possible its locking into the receptacle shell.

According to one embodiment, the receptacle shell comprises a thermoplastic flange comprising at least one oblong opening into which the projecting dimple of the back plate locks.

According to one embodiment one of the sides of the opening in the flange defines an elastic beam.

According to one embodiment, the back plate is made up of at least two movable modules.

According to one embodiment, the modules are assembled by one of their respective ends.

According to another embodiment, the ends of the modules joint consist of half-walls which, on being assembled, constitute a total thickness of insulation which is compatible with the connector contacts density.

According to another embodiment, the insulation thickness of the ends of the modules joint is a function of the size and the pitch adopted for the arrangement of the contacts.

According to an embodiment, the back plates are polygonal or circular in shape.

Figure 2:
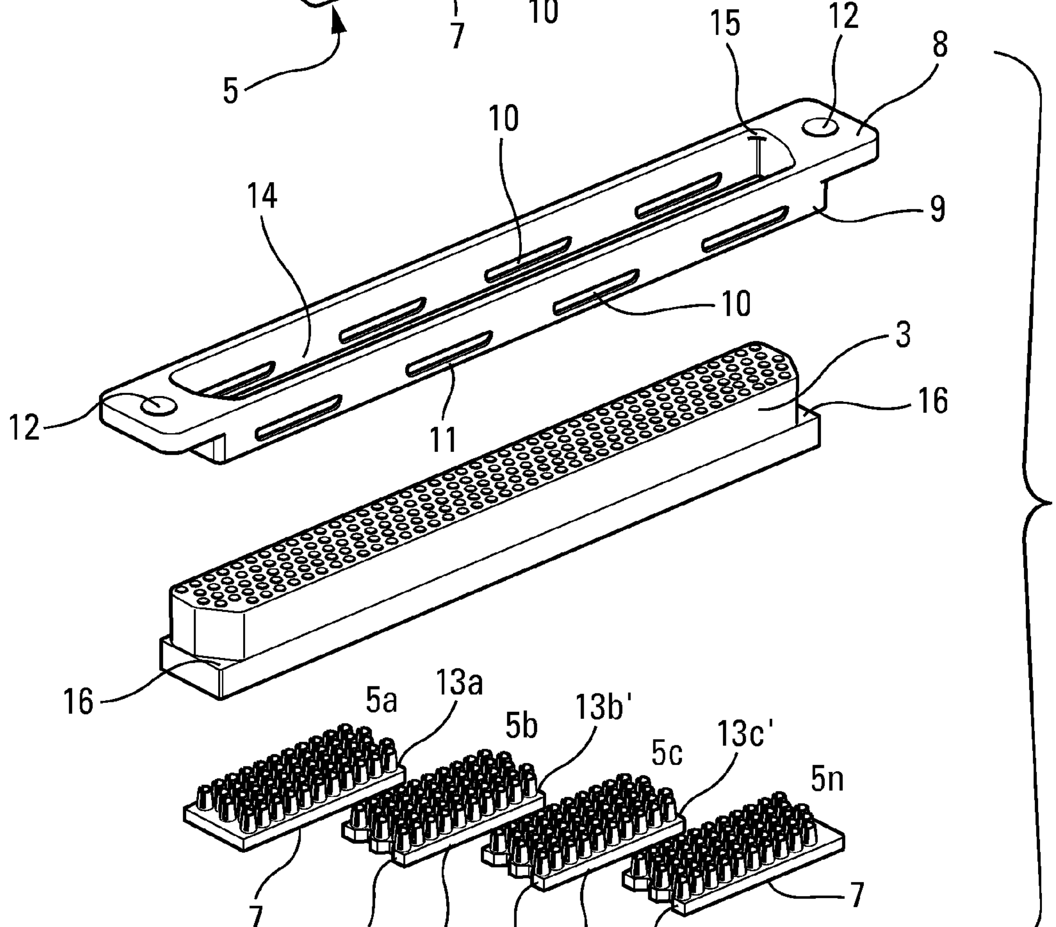
Figure 3:
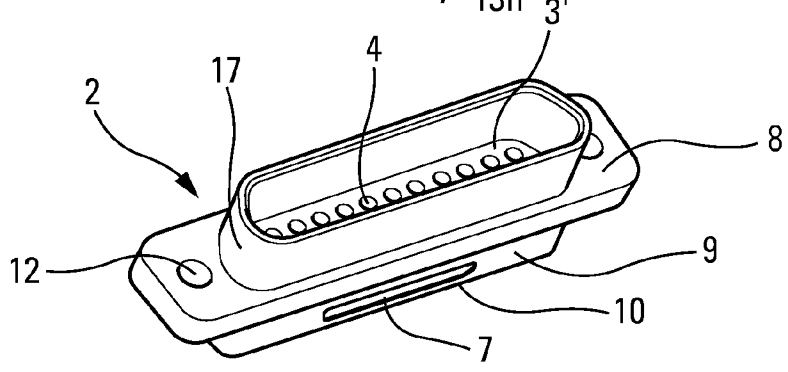
Figure 4A:
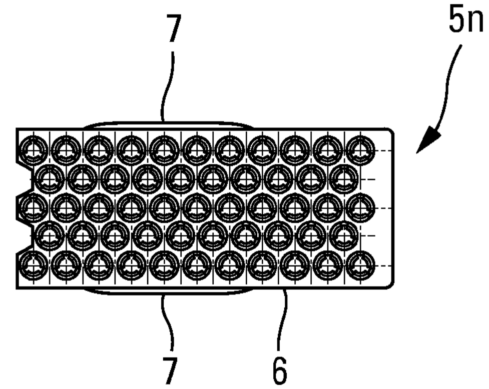
Figure 4B:
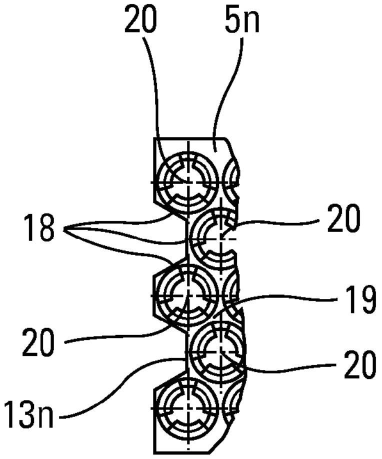
Figure 4C:
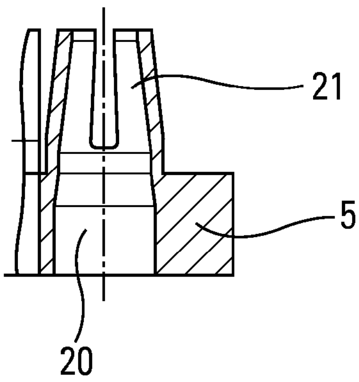
Figure 5:
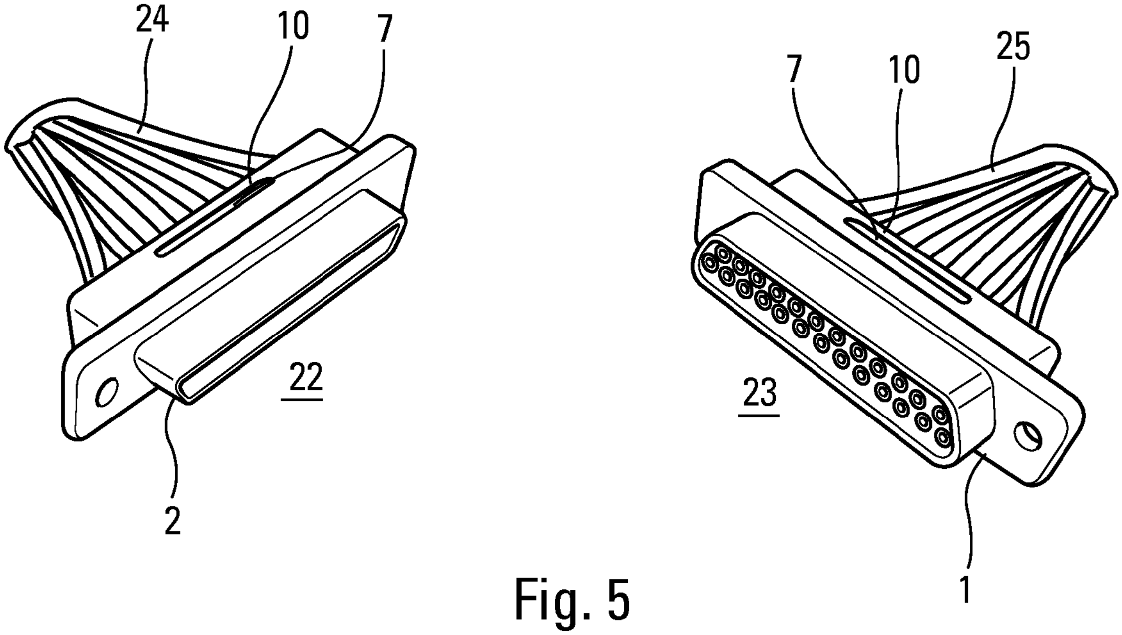

The aspects of the disclosed embodiments shall be better understood with the help of the following description and appended drawings, where the figures represent the following aspects of the disclosed embodiments, FIG. 1 is a perspective view of a connector according to the disclosed embodiments;

FIG. 2 is an exploded view of the components of a connector according to the disclosed embodiments, FIG. 3 is a perspective view of a connector complementary to the connector in FIG. 1, FIGS. 4*a* to 4*c* represent a view from below of a back plate according to the disclosed embodiments, FIG. 5 is a perspective view of two complementary mating connectors used as cable connectors.

DESCRIPTION OF THE DISCLOSED EMBODIMENTS

FIG. 1 shows a connector 1 whose front face is formed by an insulating body or insert 3 moulded from a thermoplastic material and comprising contact cavities 4 for the positioning and the retention of the contacts which shall be inserted during the wiring operation of the connector. The said contacts (not shown) may be copper or other conducting alloy electrical or optical contacts or an arrangement comprising these different types of terminal. On the back face of the insulating body 3 is arranged a back plate or rear plate 5, whose side walls 6 which can be seen in FIG. 4 comprise a projecting dimple 7.

A receptacle shell 8 moulded from a thermoplastic material, which constitutes the interface element for the coupling of connector 1 with complementary mating connector 2, comprises a flange 9, which is itself obtained during the moulding operation of the receptacle shell. The wall of this flange is provided with oblong openings 10 into which are locked the projecting dimples 7 of the back plate 5. The said openings 10 define alongside the end of the flange 9 an elastic beam 11, which, on becoming elastically deformed by the action of a push applied to the back plate 5, makes possible a forced passage of the projecting dimple 7. Then on the completion of the elastic deformation, the beam 11 recovers its original configuration and locks the back plate 5 thanks to the application of a force on the edge of the dimple 7.

The receptacle shell 8 is provided at its ends with holes 12 which make possible the holding of the mating of connector 1 and its complementary connector 2 when they are connected. The said holes 12 thus make possible the passage of screw-threaded link or of pins or of spring-loaded devices.

FIG. 2 is a perspective view of the principal parts composing a connector according to the disclosed embodiments, and introducing a modular back plate 5. In fact, when the connector is, for example, equipped with 25 contacts gauge 26, the moulding operation of the insulating body 3 takes place continuously, without plastic flash forming on the edges of the bores 4 or on the periphery of the insert. When the sub-miniature connector must be equipped with a larger number of contacts, for example with 100 contacts, the moulding of the insulating body 3 may form the flash referred to earlier and in addition may undergo deformation along its length, which would be more difficult for the corresponding back plate 5 to adapt to, the back plate likewise becoming deformed. The use of modules moreover makes it possible to limit the stress exerted by the back plate 5 on the contact-holding clips.

As it can be seen in FIG. 2, the back plate 5 consists of modules 5*a*, 5*b*, 5*c* and 5*n* whose projecting dimples 7 lock into the corresponding oblong openings 10 and fit into one another by their respective ends 13*a*-13*b*, 13*b*'-13*c* and 13*c*'-13*n* in order to constitute an overall assembly and retention plate of the contacts which equip the insulating body 3. Like a single plate 5, each module 5*a*-5*n* is movable, making possible the introduction or partial replacement of electrical, optical or electro-optical contacts (not shown), which generally equip miniature and sub-miniature connectors such as 1 and 2.

The central cavity 14 of the receptacle shell 3 has at each end a V-section with asymmetrical branches, which plays the part of a polarising key on the introduction of the insulating body 3. The central cavity 14 moreover comprises at each corner an abutment 15 on which rest the elements of the flange 16 provided at each corner of the insulating body 3. In this way, on its insertion the insulating body is positioned at the abutment and the abutments 15 and the flanges 16 together assume the function of a base, which comes into existence during the locking of the single plate 5 or of one of the modules 5*a*-5*n*.

FIG. 3 shows a complementary mating connector 2 to connector 1. The assembly of the components of connector 2 is identical with those of connector 1 with two exceptions; the first concerns the insulating body 3' whose front coupling face is located on the level of the plane defined by the upper face of the receptacle shell 8. The second concerns the flange 17, which is likewise obtained during the process of moulding of the receptacle shell opposite the face, which comprises the flange 9.

The said flange 17 serves as a reception cavity for the insulating body 3 during the connection of connectors 1 and 2. Moreover, the said flange 17 provides the protection of male type contacts, which equip connector 2. It should be noted that each end of the flange has a V-section with asymmetrical branches, which plays the part of a polarising key during connection.

FIGS. 4*a* to 4*c* show a detailed view of a plate constituting the module 5*n* whose end 13*n* was machined to form a joint end making possible its assembly with end 13*n*-1 (namely 13*c*' in the example in FIG. 2) of module 5*n*-1 (namely 5*c*).

As it can be seen in FIG. 4*b*, the walls 18 delimit a thickness between the empty machining side and the wall of cavity 20 which is of a size half the size of thickness 19 existing between the walls of the two contact cavities 20, which means that this thickness constitutes half a wall. In this way, when two modules are assembled by their respective joining ends, the walls 18 of the respective ends of the modules together re-form an insulating thickness, which is compatible with the connector contacts density.

As an example, for a 2-mm pitch between contacts in a triangular arrangement, the thickness of the insulation between two contacts of 0.5 mm diameter of the same row shall be of the order of 1 mm. It is clear that the thickness of the insulation of the joining ends in this example will then be 0.5 mm and that it shall be a function of the size of the contacts and of their arrangement for any other configuration of the connector.

FIG. 4*c* shows a contact retention clip of the back plate 5 and of modules 5*a*-5*n*, which comprises 3 fingers 21 distributed at 120° round the bore 20 allowing the passage of a contact and its holding in place in the bore 4 of the insulating body 3, 3'. The use of modules makes it possible to achieve a flawless moulding of the said clips and to provide perfect positioning, retention and locking of the connector contacts.

An example of the embodiment is shown in FIG. 5 where the connectors 1 and 2 are used as cable connectors 22, 23. The connectors 1 and 2 are provided with male and female contacts arranged in their respective insulating bodies and the projecting dimples 7 of the back plates are locked into the openings 7 after which the cables 24, 25 were positioned in the bores 20 of the back plate. It is clear that in the case of a larger cables harness, modules 5*a*-5*n* will be used according to the present invention.

The embodiments described herein shall not be limitative and the variants and modifications shall not move outside the context or the spirit of the claimed subject matter.

The invention claimed is:

1. A miniature high-density connector comprising a thermoplastic insulating body comprising contact cavities for the insertion, the positioning and the retention of electrical, optical or electro-optical contacts, a back plate comprising clips for the locking of contacts into the contact cavities of the insulating body, a receptacle shell constituting an interface element for coupling with a complementary mating connector, comprising a flange for the assembly and retention of the insulating body and of the back plate in the receptacle shell, wherein the back plate is movable and comprises at least one projecting dimple located on the side wall and making possible its locking into the receptacle shell; wherein one of the sides of opening in the flange defines an elastic beam.

2. A miniature high-density connector according to claim 1, wherein the receptacle shell comprises a thermoplastic flange.

3. A miniature high-density connector according to claim 2 wherein the flange comprises at least one opening into which the projecting dimple of the back plate locks.

4. A miniature high-density connector according to claim 3, wherein the opening in the flange is oblong in shape.

5. A miniature high-density connector according to claim 1, wherein the back plate consist of at least two movable modules.

6. A miniature high-density connector according to claim 5, wherein the modules are assembled by one of their respective ends.

7. A miniature high-density connector according to claim 6, wherein the jointing ends of the modules consist of half walls which on assembly constitute together an insulating thickness compatible with the connector contacts density.

8. A miniature high-density connector according to claim 6, wherein the insulating thickness of the jointing ends of the modules is the function of the size and the pitch adopted for the arrangement of the contacts.

9. A miniature high-density connector according to claims 5, wherein the back plates are polygonal or circular in shape.

* * * * *